May 3, 1927.
R. W. RUNGE
TRACK ROLLER
Filed April 5, 1924
1,627,413
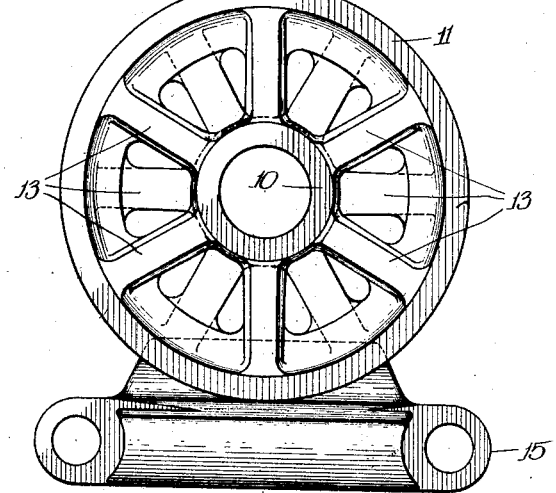
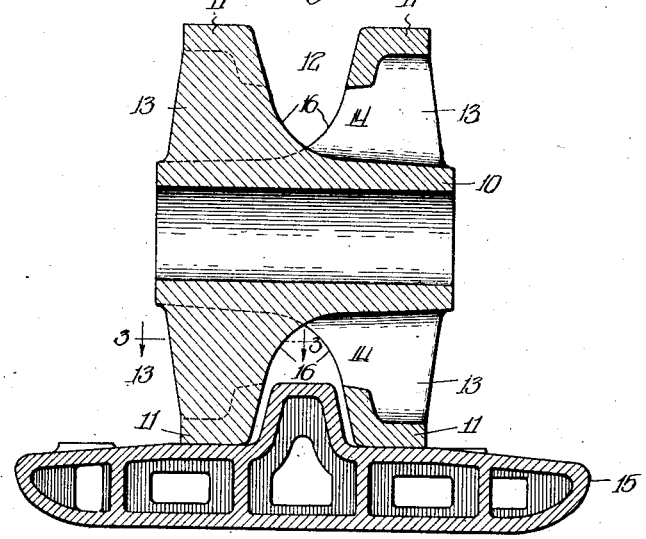
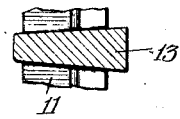
Witness
P. Burkhardt
Inventor
Richard W. Runge,
By Cromwell, Friend & Warden
Attys.

Patented May 3, 1927.

1,627,413

UNITED STATES PATENT OFFICE.

RICHARD W. RUNGE, OF OSHKOSH, WISCONSIN, ASSIGNOR TO LEACH COMPANY, OF OSHKOSH, WISCONSIN, A CORPORATION OF WISCONSIN.

TRACK ROLLER.

Application filed April 5, 1924. Serial No. 704,303.

The invention is concerned with track rollers such as are used for the purpose of supporting the weight of a vehicle upon the inside face of an endless track-band movably associated with the vehicle.

The track rollers heretofore used for the purpose specified have been characterized either by a peripheral groove adapted to engage over a lug on each of the traction shoes composing the track-band, or by a peripheral rib adapted to engage in a groove in each of the traction shoes. Such track rollers, however, are not satisfactory under all conditions of service for the reason that the dirt which is continually being thrown onto the track-band by the movement of the same collects in the groove of the roller or traction shoe, and, unless removed at frequent intervals, will fill the groove and render the guiding means between the roller and the track-band inoperative. Many attempts have been made to overcome this difficulty by the employment of variously designed side-guards, but such expedients have not proven effective, and are furthermore cumbersome, heavy and expensive.

The principal object of the invention is to provide a self-cleaning track roller which will not clog in service.

Another object is to provide such a track roller which is light, durable and inexpensive.

Other objects and advantages will occur to those skilled in the art upon a full comprehension of the structural features of the shoe.

In order that the invention may be readily understood, an exemplifying embodiment of the same is set forth in the accompanying drawing and in the following detailed description based thereon. As the invention is obviously susceptible of embodiment in other and varied constructural forms without departure from the essence of the invention and without sacrifice of its material advantages, it is to be understood that the drawing and the description are to be considered in an illustrative and not in an unnecessarily limited sense.

In the drawing—

Fig. 1 is a side view of the track roller in operative association with one of the traction shoes composing a vehicle track-band;

Fig. 2 is a vertical section through the roller and the shoe on the line 2—2 of Fig. 1; and Fig. 3 is a horizontal section through one of the spokes of the roller on the line 3—3 of Fig. 2.

It will be observed in the drawing that the track roller of the invention includes a hub portion 10, two rim portions 11 spaced to provide a peripheral groove 12, and spokes 13 between the hub and rim portions arranged in staggered relation to provide discharge passages 14 which lead inwardly and laterally from the groove throughout its circumference to the side faces of the roller. The track roller is shown in operative association with a traction shoe 15 of one particular design, but it will be appreciated that the roller is susceptible of use with any shoe having a bearing surface for the rim portions 11 and a lug for the groove 12.

The spokes 13 may be curved along their inside faces from the rim portion 11 to the hub portion 10, as shown at 16, in order to render the turns in the passage 14 more gradual, and may be tapered laterally, as shown in Fig. 3, in order to render the ends of the passages 14 more spacious.

The track roller is self-cleaning and will not clog in service, since at every point throughout the circumference of the groove in the roller, there is an unobstructed discharge passage which leads inwardly and laterally to one of the side faces of the roller, and the dirt which enters the groove will be expressed by the lug of the traction shoe through that discharge passage in radial alignment with the dirt.

I claim:

1. In a track roller, a hub portion, two rim portions spaced to provide a peripheral groove, and web portions between the hub and rim portions arranged in staggered relation to provide discharge passages which lead inwardly and laterally from the groove throughout its circumference to the side faces of the roller.

2. In a track roller, a hub portion, two rim portions spaced to provide a peripheral groove, and laterally tapering spokes between the hub and rim portions arranged in staggered relation to provide discharge passages of laterally increasing size which lead inwardly and laterally from the groove throughout its circumference to the side faces of the roller.

3. In a track roller, a hub portion, two rim portions spaced to provide a peripheral groove, and spokes between the hub and rim portions arranged in staggered relation with their inside faces curved laterally adjacent the hub portion to provide curved discharge passages which lead inwardly and laterally from the groove throughout its circumference to the side faces of the roller.

4. In a track roller, a hub portion, two rim portions spaced to provide a peripheral groove, and laterally tapering spokes between the hub and rim portions arranged in staggered relation with their inside faces curved laterally adjacent the hub to provide curved discharge passages of laterally increasing size which lead inwardly and laterally from the groove throughout its circumference to the side faces of the roller.

In testimony whereof I have hereunto subscribed my name.

RICHARD W. RUNGE.